Inventor
RICHARD EDMUND REASON
by
Emery, Holcombe & Blair
Attorney

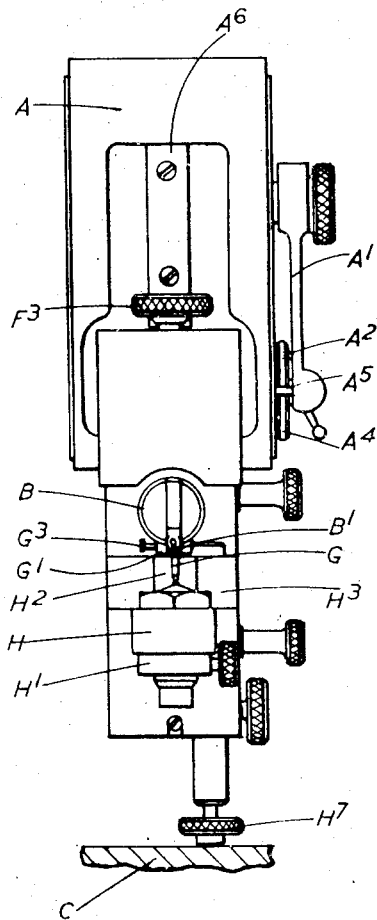
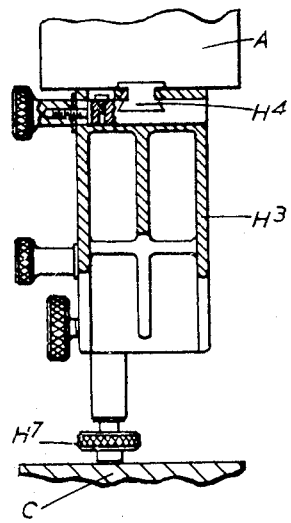
FIG.2.
FIG.3.

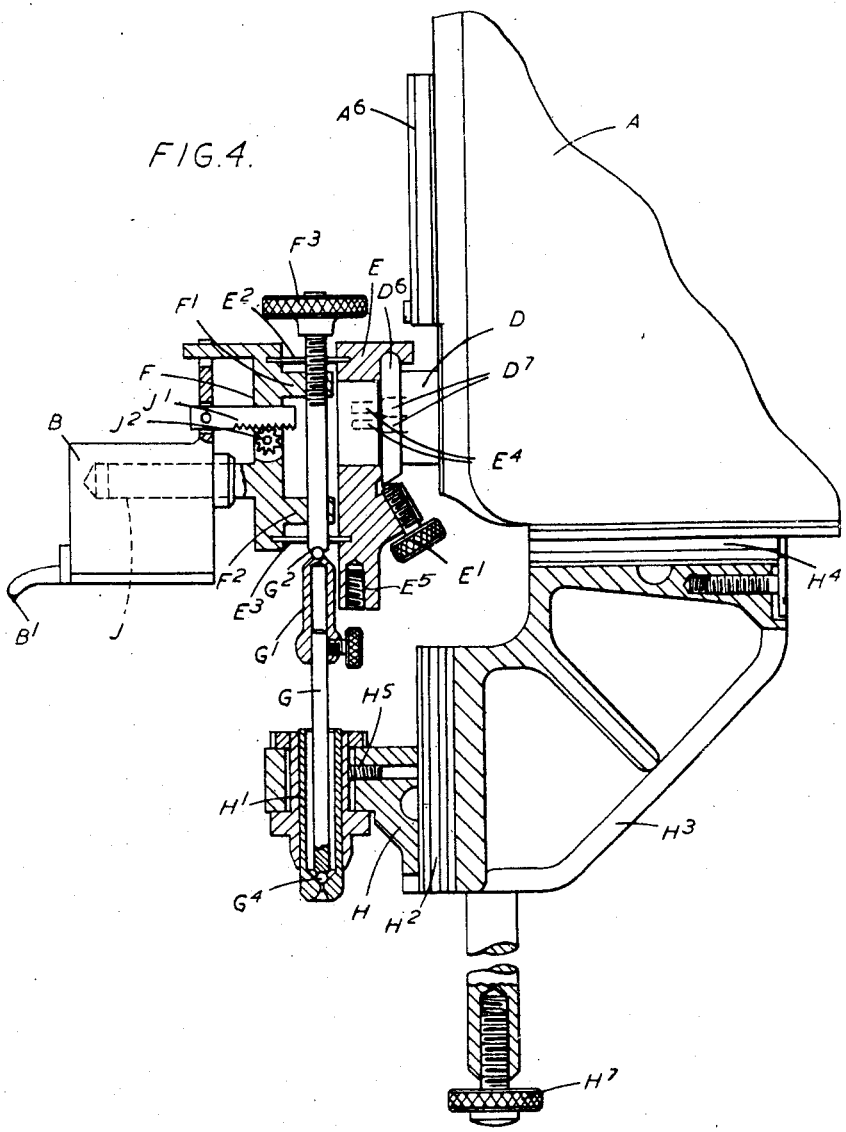
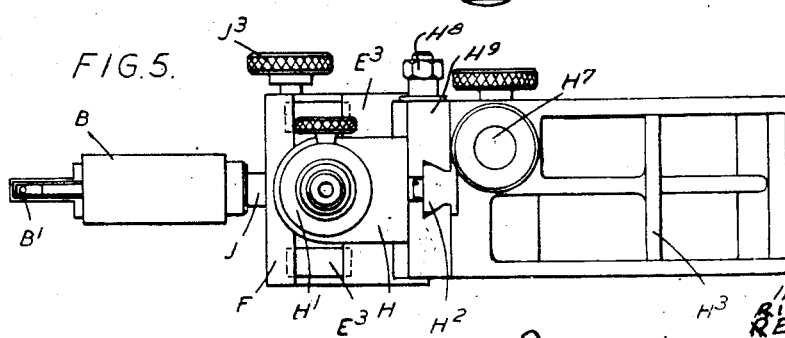

Patented Dec. 13, 1949

2,491,016

UNITED STATES PATENT OFFICE 2,491,016

APPARATUS FOR MEASURING OR INDICATING THE ROUGHNESSES OR UNDULATIONS OF A SURFACE

Richard Edmund Reason, Leicester, England, assignor to Taylor, Taylor & Hobson Limited, Leicester, England, a company of Great Britain Application August 10, 1945, Serial No. 610,092
In Great Britain August 17, 1943

Section 1, Public Law 690, August 8, 1946
Patent expires August 17, 1963

18 Claims. (Cl. 73—105)

This invention relates to apparatus for measuring or indicating the roughnesses or undulations of a surface, of the kind in which a stylus is traversed along the surface and its movements approximately normal to the surface during such traversing are utilised to control a measuring or indicating instrument. In such apparatus it is known to mount the stylus in a pick-up head which projects from a casing containing driving mechanism for effecting the traversing movement of the pick-up head.

The present invention has for its object to provide an improved mounting for the pick-up head, whereby the risk of measuring errors is reduced.

A further object of the invention is to provide means on such apparatus whereby the traversing can be made to take place along a circular path to suit investigation of a surface of circularly curved section.

Another object of the invention is to provide adjusting means whereby the part of the pick-up head adjacent to the stylus can be positioned with a high degree of accuracy relatively to the surface to be tested, more especially in a direction normal to the direction of traversing, but also in the direction of traversing.

Figure 6:
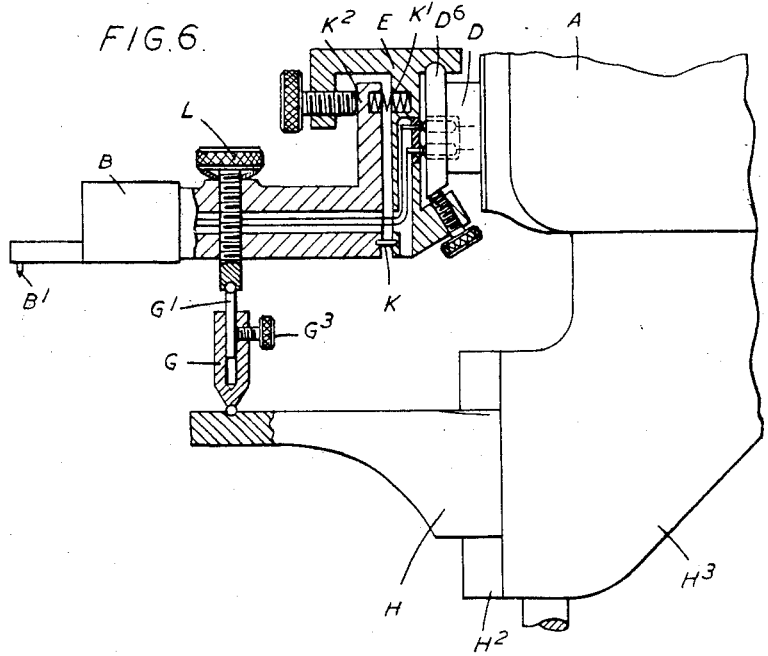
Figure 7:
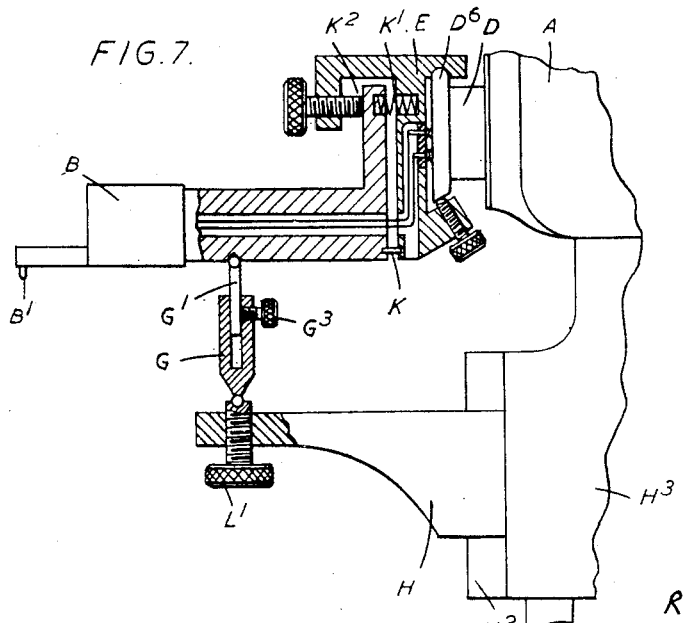
Figure 8:
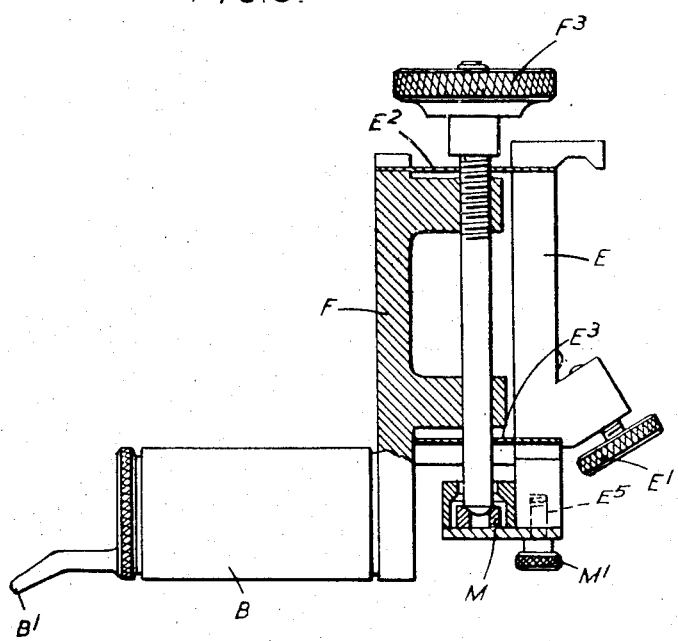
Figure 9:
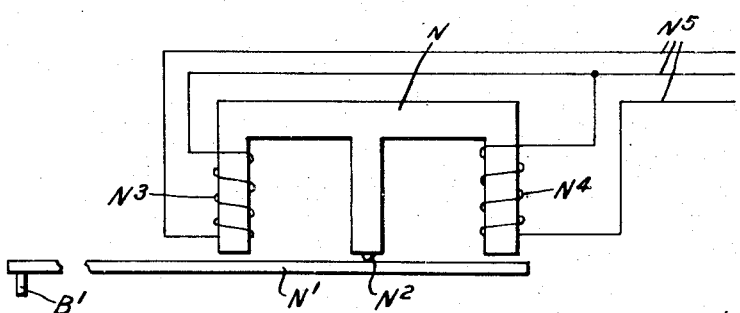

Still further objects of the invention will be apparent from the appended claims and from the following description of the accompanying drawings which show some convenient alternative practical arrangements according to the invention. In these drawings Figure 1 is a side elevation, partly in section, of one arrangement, Figure 1a is a similar side elevation showing certain parts reversed for measuring the roughness of concave surfaces, Figure 2 shows a rear elevation of the arrangement of Figure 1, Figure 3 is a vertical section on the line 3—3 of Figure 1, viewed from the front, Figure 4 is a view generally similar to that of Figure 1 of a modified arrangement, Figure 5 is an underplan view of the arrangement of Figure 4, Figures 6 and 7 illustrate two further modifications, Figure 8 illustrates the use of the apparatus for a straight line traverse, and Figure 9 diagrammatically illustrates a convenient arrangement for the detecting means.

Figure 1:
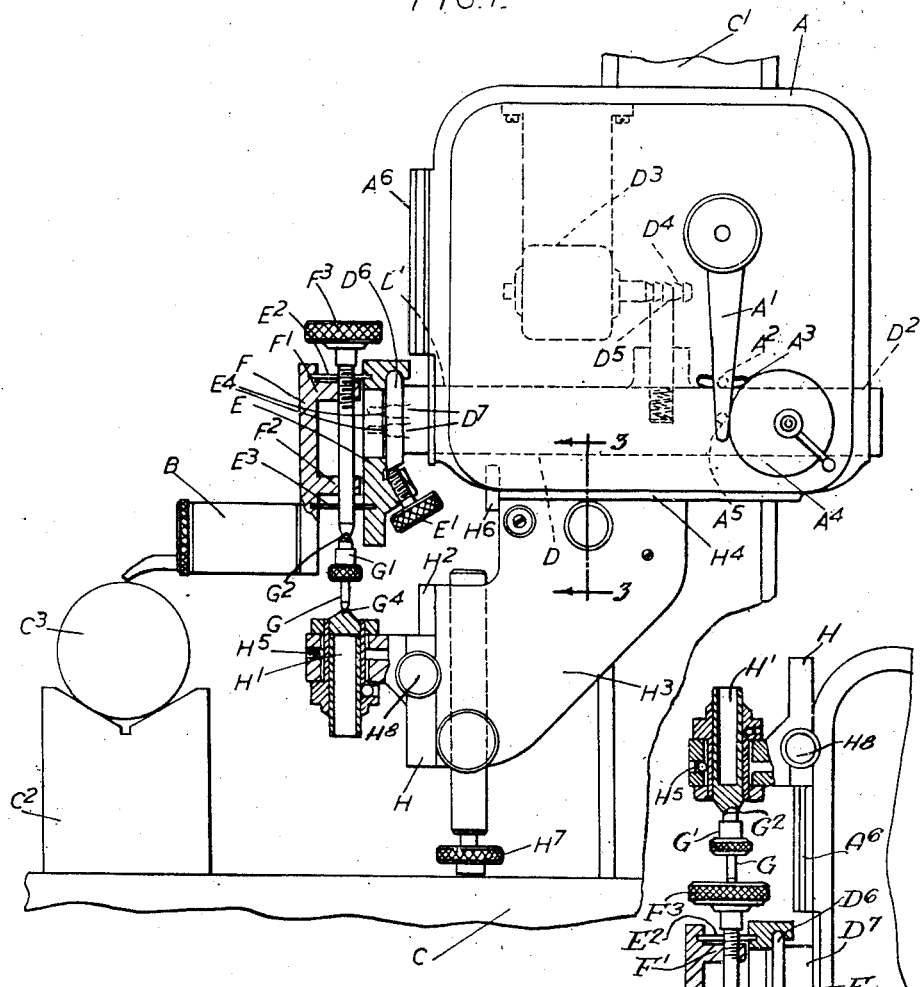
Figure 1A:
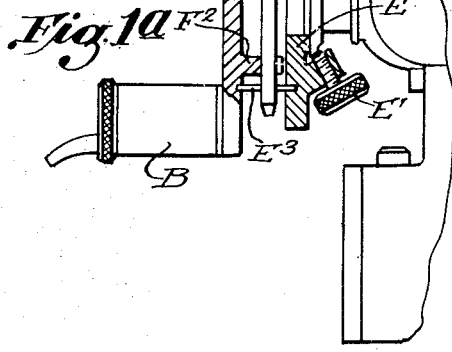

In the arrangement of Figures 1 to 3, the apparatus comprises a casing A, which contains driving mechanism for effecting the traversing movement of the pick-up head B and is adjustably mounted on a vertical column $C^1$ extending up from a base C which also carries an adjustable work support $C^2$ on which small articles $C^3$ whose surfaces are to be investigated can be mounted. The arrangement is preferably such as to permit the whole apparatus to be brought into operative positional relationship with the surface to be tested in cases where the article bearing the surface cannot readily be mounted on the work support $C^2$.

The driving mechanism within the casing A may take various forms, and may be arranged for example in the manner described in U.S. patent specification No. 2,329,084 or preferably in the specification of U. S. application Serial No. 539,862, now Patent No. 2,483,668, granted Oct. 4, 1949. The driven member consists of a bar D projecting from the casing A and driven by the mechanism in the direction of its length.

Figure 1 shows diagrammatically in dotted line one simple form of driving mechanism for the bar D, which is shown as supported in guides $D^1D^2$ in the wall of the casing A. Other forms of support for the bar D may be employed, if preferred, such for example as the linkage mechanism described in Patent No. 2,483,668 above mentioned. The traversing drive is derived from an electric motor $D^3$ through a ratchet-toothed screwthread $D^4$, with which a half-nut $D^5$ carried by the traversing bar D engages, in the manner described in specification No. 2,329,084, thus providing a traversing drive at the desired relatively slow speed in the forward direction whilst permitting quick resetting to the starting position. Such resetting is controlled by a starting lever $A^1$ mounted on the outside of the casing A through a stud $A^2$ which passes through a slot $A^3$ in the casing wall to engage a shoulder on the traversing bar D. A hand-operated cam $A^4$ engaging with a pin $A^5$ on the starting lever $A^1$ is also provided on the outside of the casing A for setting purposes, as will be described later.

The direction of drive will usually be horizontal or approximately horizontal. The driven bar D carries at its end a plate D⁶ having shaped top and bottom edges which constitute a dovetail fitting on to which a supporting member E can be fitted, such member E being provided with a clamping device E¹ for securing it rigidly to the plate D⁶ when it has been fitted in position thereon.

This supporting member E has rigidly secured to it at the top and bottom the edges of two flat spring ligaments E²E³ whose opposite edges are similarly secured to a plate F forming part of the pick-up head B. The two ligaments E²E³ are so mounted that they form a parallelogram with the supporting member E and the plate F and consequently constrain the plate always to remain at right angles to the direction of movement of the driven bar D. For simplicity in description it will hereinafter be assumed that such direction of movement is horizontal, so that parts which lie parallel to the direction of movement will be referred to as horizontal and parts at right angles to such direction as vertical. Thus the plate F just mentioned will therefore be termed the vertical plate.

The pick-up head B comprises a housing, which is carried by the vertical plate F and contains an electromagnetic device (not shown), the armature of which carries the stylus B¹. The electromagnetic device may be arranged in various ways, for example in the manner shown diagrammatically in Figure 9. Full constructional details of this arrangement are described in U. S. Patent specification No. 2,398,666. As will be seen from Figure 9, the electromagnetic device consists of an E-shaped magnetic core N, which is suitably mounted in the pick-up head B. The stylus B¹ is carried by an armature N¹, which extends close to the free ends of the outer limbs of the core N and is pivoted about a knife-edge N² carried by the centre limb of the core. The two outer limbs of the core respectively carry windings N³N⁴, and it will be clear that with this arrangement the working movements of the stylus B¹ approximately normal to the test surface will cause the inductances of the windings N³N⁴ to be altered differentially. These inductance changes are employed to control electrically the measuring or indicating instrument, which may consist for instance of a pen recorder. The flexible leads N⁵ from the electromagnetic device are taken to terminal studs E⁴ on the supporting member E, these studs contacting with corresponding studs D⁷ on the plate D⁶ on the end of the driven bar D in the casing A, the electrical circuits thus being completed when the supporting member E is secured in position on such plate.

The vertical plate F also carries brackets F¹F² through which extends a vertical adjusting screw F³, whose lower end is in the form of a socket and constitutes a thrust member with which a ball G² on the upper end of a radius link GG¹ can engage. This radius link GG¹ is formed in two parts G and G¹ telescopically adjustable relatively to one another with a clamping device G³ (Figure 2) for clamping the two parts together in any position of adjustment. A ball G⁴ on the lower end of the radius link GG¹ engages with a socket in a bush H¹ in a thrust block H mounted on a vertical slide H² on a bracket H³ carried by the casing A, so that its position on the bracket can be varied and secured in adjusted position by a fastener such as a screw H⁸ and block H⁹, as a coarse adjustment, to suit the length of the radius link GG¹, operation of the adjusting screw F³ constituting a fine adjustment for adjusting the stylus on to the surface to be tested. The spring force exerted by the two ligaments E²E³ acts to maintain the adjusting screw F³ in engagement with the radius link GG¹ and therefore also to maintain such link in engagement with the bush H¹ in the thrust block H. The bracket H³ carrying the thrust block H is preferably detachably mounted on the casing A, for example on a horizontal slide H⁴, and its operative position on the casing A is such that the radius link GG¹ lies properly at right angles to the direction of traversing in one predetermined traversing position, which may conveniently be indicated by an index and pointer on the driving bar D and the casing A.

The upper end of the adjusting screw F³ is also formed as a thrust member to receive the radius link, and an additional vertical slide A⁶ is provided on upper part of the casing A on to which the thrust block H can be fitted as illustrated in Figure 1a, thus enabling the apparatus to deal with concave test surfaces as well as with convex ones.

In operation, the radius link GG¹ is first set to a length accurately equal to the radius of the test surface, and is inserted in position, the thrust block H on the bracket H³ being adjusted on its slide H² substantially to the correct position to suit the length of the radius link. In order to ensure that the radius link lies parallel to that radius of the article C³ under test which contains the stylus, the traversing bar D is conveniently first moved to the position shown by the cam A⁴, a stop (not shown) being provided to arrest the movement of the cam in this position. This is the position in which the radius link GG¹ is known to be vertical, the bush H¹ having been already set in the appropriate position in the thrust block H by its radial screws H⁵ to suit the position of the stop for the cam A⁴ and also the position of the stop H⁶ against which the bracket H³ is clamped on its slide H⁴. Since the radius link GG¹ can thus be readily set into the vertical position in this way by the operation of the cam A⁴ it is easy to ensure the desired parallelism by moving the work support C² longitudinally along the base C until the stylus B¹ is seen to be in engagement with the highest point of the work, the adjusting screw F³ being operated as may be necessary to move the pick-up head B vertically to bring the stylus into the correct position in which the pen of the pen recorder is approximately in the middle of the chart. After this initial setting has been effected, the cam A⁴ is moved to its inoperative position out of the path of the pin A⁵ on the starting lever A¹ and this lever is moved to the starting position in readiness for starting the traversing drive. The apparatus can be steadied against floor vibrations by means of an adjustable foot H⁷ on the bracket H³ or by means of an adjustable rigid arm extending from the casing A into engagement with the test surface or with a fixed surface adjacent thereto.

The ordinary adjusting mechanism for the work support C² on the base C will usually suffice to bring the work into the correct longitudinal position with its highest point beneath the stylus B¹, but, if desired, a fine adjustment for this longitudinal setting may be provided between the radius link and the stylus, as in the modified arrangement shown in Figures 4 and 5. In this modification the vertical plate F, instead of being rigidly connected to the housing of the pick-up head B, rigidly carries a horizontal shaft J on which the pick-up housing can slide under the control through a rack J¹ and pinion J² of an adjusting knob J³. Figure 4 also serves to show by way of example a mounting for a longer radius link GG¹ to accommodate larger test surface radii. In other respects the arrangement of Figures 4 and 5 is generally similar to that of Figures 1 to 3 and the same reference letters are employed where applicable. It will be realised that the vertical adjusting screw F³ can be omitted if the adjustment of the thrust block H on its slide H² is sufficiently fine, the radius link then abutting against a part of the vertical plate F itself.

It will be clear that with this arrangement the apparatus can be adjusted with a high degree of accuracy to effect traversing of the pick-up head along a circular path of any desired curvature to suit the particular test piece, and the necessity for providing on the pick-up head a guiding skid running over the test surface is thus eliminated.

It is not essential to the invention that the operative connection between the supporting member E and the pick-up head B should give a parallel motion or that the direction of traversing of the supporting member should be along a straight-line path. Thus in one modification, shown in two alternative embodiments in Figures 6 and 7, the supporting member E is driven along a more or less straight-line path as above described but is connected to the pick-up head B through a single spring ligament K, thus permitting limited pivotal movement of the head, and the radius link GG¹ engages with a point of the head separated by an appreciable distance from such hinge K. A small spring K¹ serves to press the pick-up head B about the hinge K into engagement with the radius link, and a stop K² is provided to hold the pick-up head when not engaging with the radius link. In the arrangement shown in Figure 6, the upper end of the radius link GG¹ engages in a socket in an adjustment screw L carried by the pick-up head B for vertical fine adjustment purposes, whilst its lower end engages in a nipple in the thrust block H. In the alternative shown in Figure 7, the fine adjustment screw L¹ is carried by the thrust block H and the upper end of the radius link engages in a nipple in the pick-up head. In either arrangement the part of the pick-up head adjacent to the stylus B¹ will be caused during traversing to move along a path which is (with appropriate dimensioning of the parts) a close approximation to a circular path of radius less than the length of the radius link.

The same apparatus can also be used for traversing the pick-up head along a substantially straight path instead of a circular path, when desired. The manner in which this is achieved is shown in Figure 8. Thus all that is necessary to obtain a straight traverse (assuming that the traversing bar D itself moves along a straight path) is to provide a detachable abutment M which can be attached to the supporting member E by means of a thumb screw M¹ which screws into a tapped hole E⁵ in the under face of the supporting member E so as to engage with the end of the adjusting screw F³. The spring force exerted by the ligaments E²E³ acts to maintain the adjusting screw F³ in engagement with the abutment M and it will be clear that operation of the adjusting screw will cause the pick-up head to move vertically up and down, the correct position of adjustment being obtained in practice by operating the adjusting screw to bring the pen of the recorder near the middle of the chart.

What I claim as my invention and desire to secure by Letters Patent is:

1. Apparatus for measuring or indicating the roughnesses or undulations of a surface of circularly curved section, comprising a stylus for engaging with the surface, a pick-up head carrying the stylus, a supporting member to which the pick-up head is operatively connected, a casing on which such member is movably mounted, means within the casing for driving the supporting member relatively to the casing, a thrust element carried by the pick-up head, a second thrust element carried by the casing, a radius link interposed between the two thrust elements for constraining the pick-up head to be traversed along a substantially circular path corresponding to the surface section by the movement of the supporting member, and detecting means responsive to the relative movements between the stylus and the pick-up head during traversing.

2. Apparatus for measuring or indicating the roughnesses or undulations of a surface of circularly curved section, comprising a stylus for engaging with the surface, a pick-up head carrying the stylus, a supporting member to which the pick-up head is operatively connected, a casing on which such member is movably mounted, means within the casing for driving the supporting member relatively to the casing, a thrust element carried by the pick-up head, a second thrust element carried by the casing, spring means for urging such thrust elements towards one another, a radius link making butt contact with and interposed between the two thrust elements for constraining the pick-up head to be traversed along a substantially circular path corresponding to the surface section by the movement of the supporting member, and detecting means responsive to the relative movements between the stylus and the pick-up head during traversing.

3. Apparatus for measuring or indicating the roughnesses or undulations of a surface of circularly curved section, comprising a stylus for engaging with the surface, a pick-up head carrying the stylus, a supporting member to which the pick-up head is operatively connected, a casing on which such member is movably mounted, means within the casing for driving the supporting member relatively to the casing, a thrust element carried by the pick-up head, a second thrust element carried by the casing, at least one spring ligament hinge constituting the operative connection between the pick-up head and the supporting member and acting to urge the two thrust elements towards one another, a radius link making butt contact with and interposed between the two thrust elements for constraining the pick-up head to be traversed along a substantially circular path corresponding to the surface section by the movement of the supporting member, and detecting means reponsive to the relative movements between the stylus and the pick-up head during traversing.

4. Apparatus for measuring or indicating the roughnesses or undulations of a surface of circularly curved section, comprising a stylus for engaging with the surface, a pick-up head carrying the stylus, a supporting member to which the pick-up head is operatively connected, a casing on which such member is movably mounted, means within the casing for driving the supporting member relatively to the casing along an approximately straight path, a thrust element carried by the pick-up head, a second thrust element carried by the casing, a pair of spring ligament hinges in the form of a resilient parallel-motion linkage constituting the operative connection between the pick-up head and the supporting member and acting to urge the two thrust elements towards one another, a radius link of effective length equal to the radius of the section of the test surface interposed between the two thrust elements for constraining the pick-up head to be traversed along a substantially circular path corresponding to the surface section by the movement of the supporting member, and detecting means responsive to the relative movements between the stylus and the pick-up head during traversing.

5. The combination with the features set forth in claim 1, of means for adjusting the effective distance between the two thrust elements for accommodating different lengths of radius link.

6. The combination with the features set forth in claim 3, of means for adjusting the effective distance between the two thrust elements for accommodating different lengths of radius link.

7. The combination with the features set forth in claim 1, of means for adjusting the effective distance between the two thrust elements for accommodating different lengths of radius link, such means comprising coarse adjustment means for varying the position of the second thrust element on the casing and fine adjustment means for controlling the position of the first thrust element on the pick-up head.

8. The combination with the features set forth in claim 4 of means for adjusting the effective distance between the two thrust elements for accommodating different lengths of radius link, such means comprising coarse adjustment means for varying the position of the second thrust element on the casing and fine adjustment means for controlling the position of the first thrust element on the pick-up head.

9. Measuring or indicating apparatus as claimed in claim 1, in which the first thrust element on the pick-up head projects through the head, and the casing is provided with means for carrying the second thrust element in a position to cooperate through the radius link with either end of said first thrust element.

10. Apparatus for measuring or indicating the roughnesses or undulations of a surface of circularly curved section, comprising a stylus for engaging with the surface, a pick-up head carrying the stylus, a supporting member to which the pick-up head is operatively connected, a casing on which such member is movably mounted, means within the casing for driving the supporting member relatively to the casing, a thrust element carried by and projecting through the pick-up head, two slides on the casing disposed respectively beyond the two ends of such thrust element, a detachable second thrust element which can be secured in any desired position of adjustment on either of the two slides, a radius link of length suited to the radius of the test surface interposed between the second thrust element and one end or the other of the first thrust element for constraining the pick-up head to be traversed along a convex or concave substantially circular path corresponding to the surface section by the movement of the supporting member, and detecting means responsive to the relative movements between the stylus and the pick-up head during traversing.

11. The combination with the features set forth in claim 1, of means on said radius link for varying its effective length to suit the radius of the section of the test surface.

12. The combination with the features set forth in claim 2, of means on said radius link for varying its effective length to suit the radius of the section of the test surface, and means for adjusting the effective distance between the two thrust elements.

13. The combination with the features set forth in claim 1, of means for adjusting the distance between the points of engagement of the stylus with the test surface and of the radius link with the pick-up head.

14. The combination with the features set forth in claim 3, of means for adjusting the distance between the points of engagement of the stylus with the test surface and of the radius link with the pick-up head.

15. Apparatus for measuring or indicating the roughnesses or undulations of a surface, comprising a stylus for engaging with the surface, a pick-up head carrying the stylus, a supporting member, a resilient operative connection between the supporting member and the pick-up head, a casing on which the supporting member is movably mounted, means within the casing for driving the supporting member along a substantially straight path relatively to the casing, a thrust element adjustably mounted on the pick-up head, a fitting on the supporting member for holding a detachable abutment in position to engage with the thrust element on the pick-up head and thereby causing the pick-up head to be traversed along a substantially straight path by the movement of the supporting member, a detachable second thrust element, a fitting on the casing for receiving such second thrust element, a detachable radius link which can be interposed between the two thrust elements for constraining the pick-up head to be traversed along a substantially circular path, and detecting means responsive to the relative movements between the stylus and the pick-up head during traversing.

16. Measuring or indicating apparatus as claimed in claim 15, in which the resilient connection between the supporting member and the pick-up head comprises at least one spring ligament hinge.

17. Measuring or indicating apparatus as claimed in claim 15, in which the resilient operative connection between the supporting member and the pick-up head comprises a pair of spring ligament hinges constituting in effect a resilient parallel-motion linkage.

18. Apparatus for measuring or indicating the roughnesses or undulations of a surface, comprising a stylus for engaging with the surface, a pick-up head carrying the stylus, a supporting member for the pick-up head, a casing on which the supporting member is movably mounted, means within the casing for driving the supporting member along a substantially straight path relatively to the casing, a thrust element adjustably mounted on the pick-up head, a detachable and reversible second thrust element, a plurality of vertically aligned fittings on the casing for receiving such second thrust element, a detachable radius link which can be interposed between the two thrust elements in either position of said second thrust element for constraining the pick-up head to be traversed along a substantially circular path, and detecting means responsive to the relative movements between the stylus and the pick-up head during traversing.

RICHARD EDMUND REASON.

REFERENCES CITED

The following references are of record in the file of this patent:

UNITED STATES PATENTS

| Number | Name | Date |
| --- | --- | --- |
| 2,171,433 | Powers | Aug. 29, 1939 |
| 2,240,278 | Abbott | Apr. 29, 1941 |
| 2,329,084 | Reason | Sept. 7, 1943 |
| 2,330,801 | Abbott | Oct. 5, 1943 |